United States Patent
Leeds

(10) Patent No.: US 8,553,852 B2
(45) Date of Patent: *Oct. 8, 2013

(54) METHOD AND APPARATUS FOR CONVERSATION BASED RINGTONE

(75) Inventor: Richard Leeds, Bellevue, WA (US)

(73) Assignee: Computer Product Introductions Corp., Bellevue, WA (US)

( * ) Notice: Subject to any disclaimer, the term of this patent is extended or adjusted under 35 U.S.C. 154(b) by 970 days.

This patent is subject to a terminal disclaimer.

(21) Appl. No.: 12/039,596

(22) Filed: Feb. 28, 2008

(65) Prior Publication Data

US 2009/0220067 A1 Sep. 3, 2009

(51) Int. Cl.
*H04M 1/64* (2006.01)

(52) U.S. Cl.
USPC .......... 379/76; 379/88.22; 379/164; 379/179; 379/252; 379/373.01; 455/567

(58) Field of Classification Search
USPC ........ 379/142.04, 372–374.02, 88.16, 48, 72, 379/76, 88.22, 100.06, 164, 179, 192, 252; 455/567

See application file for complete search history.

(56) References Cited

U.S. PATENT DOCUMENTS

| | | | |
|---|---|---|---|
| 6,400,808 B1 | 6/2002 | Burg | |
| 7,027,569 B2 * | 4/2006 | Price | 379/88.16 |
| 7,127,238 B2 | 10/2006 | Vandermeijden et al. | |
| 7,310,416 B1 * | 12/2007 | Henderson | 379/142.04 |
| 2003/0026416 A1 * | 2/2003 | Fusco | 379/374.02 |
| 2004/0067751 A1 | 4/2004 | Vandermeijden et al. | |
| 2004/0120505 A1 | 6/2004 | Kotzin et al. | |
| 2004/0235520 A1 | 11/2004 | Cadiz et al. | |
| 2006/0003814 A1 | 1/2006 | Moody et al. | |
| 2006/0111085 A1 | 5/2006 | Lee | |
| 2006/0148459 A1 | 7/2006 | Wolfman et al. | |
| 2006/0199575 A1 | 9/2006 | Moore et al. | |
| 2006/0215827 A1 | 9/2006 | Pleging et al. | |
| 2007/0064921 A1 | 3/2007 | Albukerk et al. | |
| 2007/0117554 A1 | 5/2007 | Armos | |
| 2007/0264978 A1 | 11/2007 | Stoops | |

FOREIGN PATENT DOCUMENTS

| | | |
|---|---|---|
| EP | 0 802 661 A2 | 10/1997 |
| EP | 1 098 503 A2 | 5/2001 |
| EP | 1 814 296 A1 | 8/2007 |

\* cited by examiner

*Primary Examiner* — Md S Elahee
(74) *Attorney, Agent, or Firm* — LaRiviere, Grubman & Payne, LLP

(57) ABSTRACT

A method for generating a ring tone for a given caller based on a prior conversation with that caller. A portion of a conversation with a given caller is recorded and stored in memory as a ring tone. When a subsequent call is received from the same caller, identified by caller ID, the ring tone is played, alerting the user to the incoming call as well as the context of their prior communication. In alternative embodiments of the invention, a prior textual or video conversation is used as the basis for a ringtone. The invention is capable of implementation in telecommunications systems such as cellular, local exchange, and VOIP.

8 Claims, 10 Drawing Sheets

METHOD AND APPARATUS FOR CONVERSATION BASED RINGTONE

TECHNICAL FIELD

The present invention relates to the field of telecommunications. More specifically, the present invention relates to a system and method for generating a customized ring tone based upon a previous conversation.

COMPUTER PROGRAM LISTING APPENDIX ON COMPACT DISC

A computer program listing appendix on compact disc is included as part of this application and the contents of the compact discs are incorporated herein by reference in their entirety for all purposes. The computer program listing appendix includes two compact discs (including duplicates) that are identical copies of each other. Each compact disc contains the following files: gnash.txt, 7,599,680 bytes, created Feb. 27, 2008; SDL_soutrce.txt, 24,217 bytes, created Feb. 27, 2008; sound_play.txt, 3,113 bytes, created Feb. 27, 2008; wxCommunicator.txt, 31,594,545 bytes, created Feb. 27, 2008; and modified_wxCommunicator.txt, 7,605 bytes, created Feb. 27, 2008.

BACKGROUND ART

A ring tone is an audio segment played to alert the user of a telecommunications device to an incoming phone call or other type of communication. Ring tones are typically stored as digital audio files on a telecommunications device such as a cellular phone. Customizable ring tones have gained in popularity, as they allow users to set a specific ring tone to be played when receiving a call from a specific person recognized by their caller ID. Many carriers offer services whereby users may download specialized ring tones such as songs or other sound effects directly to a device. In the alternative, digital audio files may be uploaded to a telecommunications device and used as a ring tone. Utilities exist that enable users to create their own ring tones based on pre-recorded sounds, allowing mixing of multiple sounds and other forms of audio manipulation.

However, though a diversity of customization options exists for the creation of ring tones, these technologies only facilitate the singular function of identifying the calling party to the user. Existing ring tone technologies do not provide the user with any additional information relating to the caller or the probable context of their call. Therefore, additional utility would be derived if a ring tone not only aided in identification of the caller, but also provided information as to the probable intent of the caller. The present invention solves this problem through the creation of a ring tone which incorporates the content of previous correspondence with the caller.

DISCLOSURE OF THE INVENTION

The present invention is a system and method for generating a ring tone based on a prior audio, video, or textual conversation stream. The invention is applicable to telecommunications systems and associated devices, including cellular, local exchange, voice-over-IP, etc.

In one embodiment of the invention, a ring tone is generated from a recorded portion of a conversation with a caller. The ring tone is subsequently played when receiving a call from the same caller, who is identified by caller ID.

In another embodiment of the invention, a ring tone is generated by converting a text message, or portion thereof, to audio speech. The audio speech is then played when receiving a call from the same person, identified by caller ID.

Detailed methods are disclosed for implementation of the present invention in both a Netstream-type communications system and a SIP-style communications system.

BRIEF DESCRIPTION OF THE DRAWINGS

For a better understanding of the present invention, reference is made to the below-referenced accompanying drawings. Reference numbers refer to the same or equivalent parts of the present invention throughout the several figures of the drawings.

MODES FOR CARRYING OUT THE INVENTION

The present invention is drawn to a system and method for creating a customized ring tone based upon a prior audio or textual conversation stream.

Figure 1:
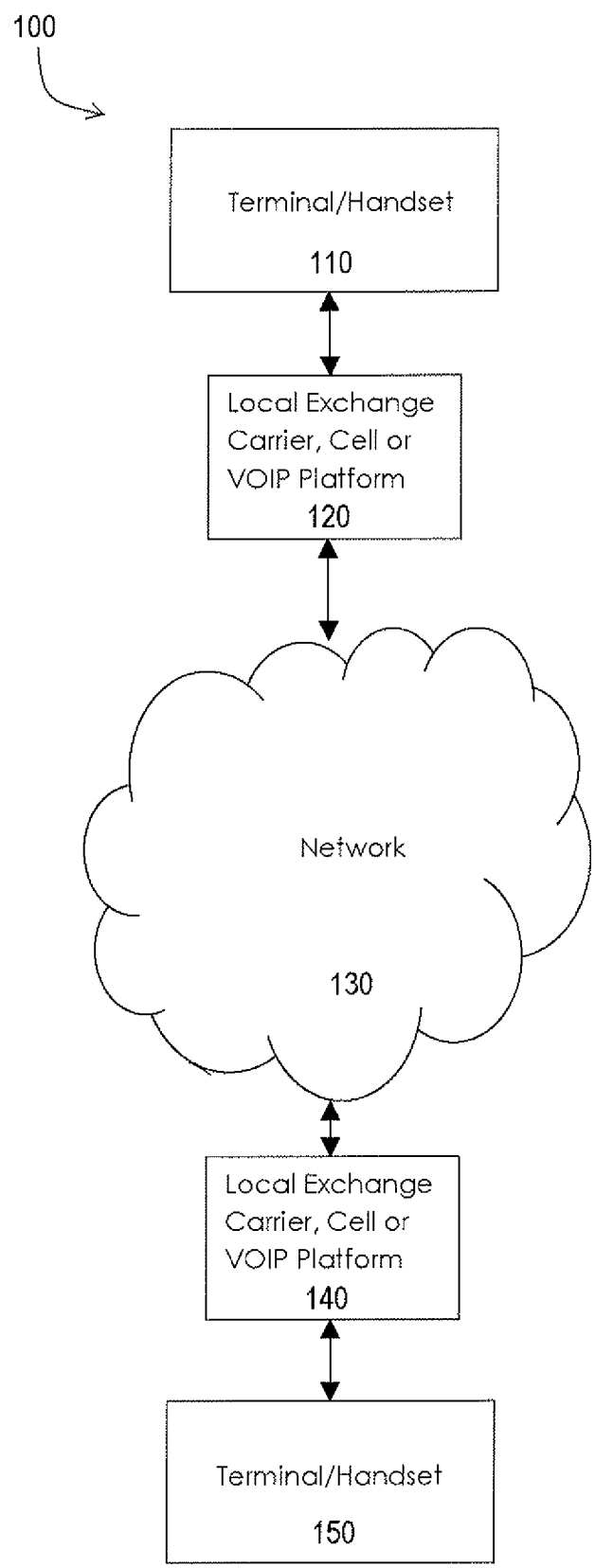
FIG. 1 is a block diagram showing the components of a standard telecommunications system.

With reference to FIG. 1, a diagram of a standard telecommunications system 100, in which the present invention may be implemented, is shown. A first user (not shown) uses terminal/handset 110 to communicate with a second user (not shown) who uses terminal/handset 150. The terms "terminal" and "handset" as herein disclosed are used interchangeably and generically refer to telecommunications devices such as a cellular phone, pager, PDA, laptop, personal computer, etc. Terminals 110 and 150 transmit and receive data via platforms 120 and 140, respectively, which constitute communications platforms such as a private branch exchange (PBX), local exchange carrier (LEC), cellular platform, voice-over-IP (VOIP) platform, etc. Platforms 120 and 140 each connect to network 130, which may be any network, wired or wireless, ranging from a small private local network to the combined capability of the world's legacy hardwired systems (including the public switched telephone network (PSTN)) and the Internet.

Figure 2:
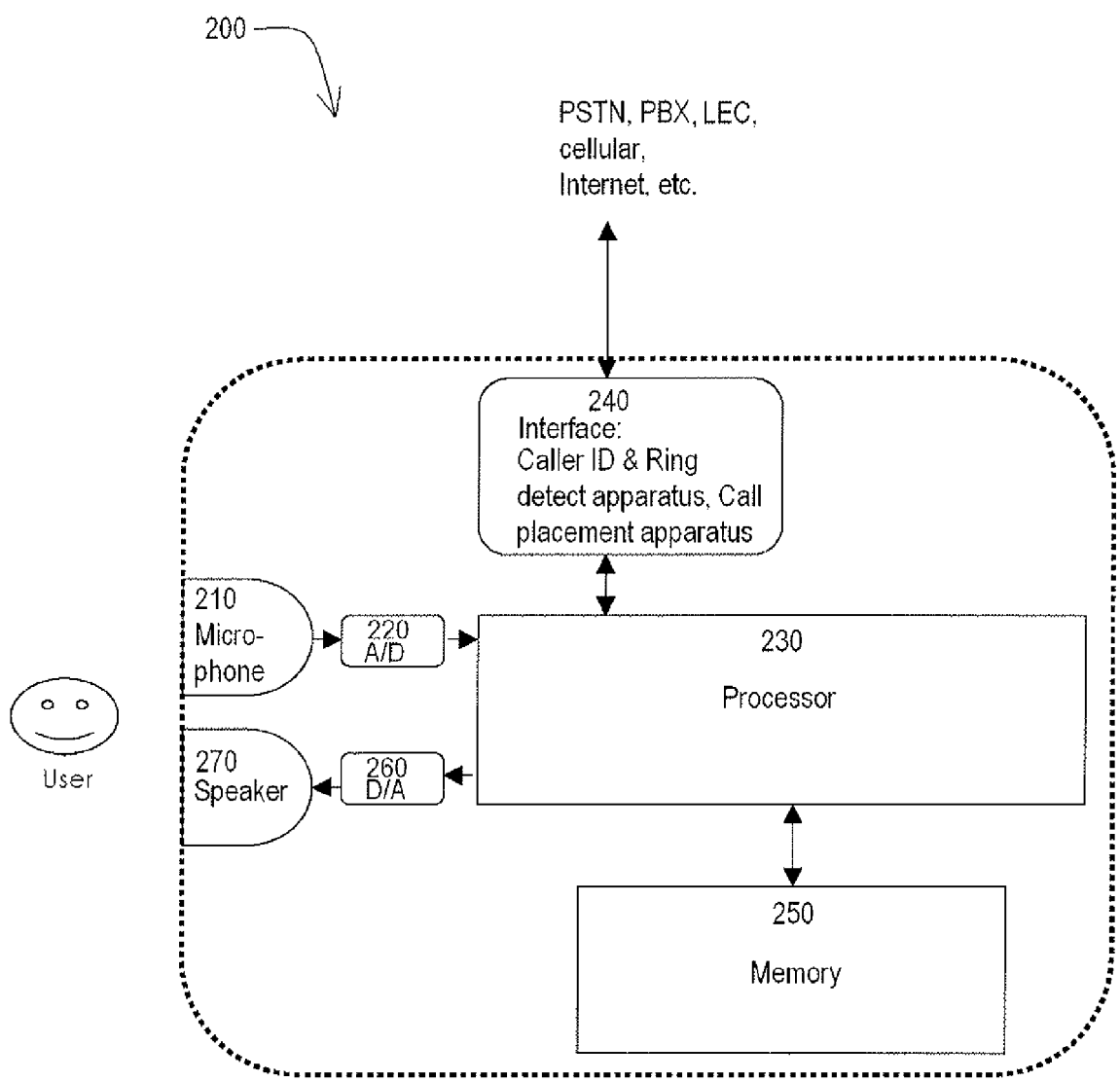
FIG. 2 is a schematic diagram showing the components of a terminal/handset.

With reference to FIG. 2, an exemplary schematic of a terminal/handset 200, in which the present invention may be implemented, is shown. Microphone 210 receives audio input from a user, which is converted to digital format by analog-to-digital converter 220. Similarly, a user listens to audio at speaker 270, the audio signal being produced from digital format by way of digital-to-analog converter 260. Processor 230 performs operations and processing, and is coupled to converters 220 and 260, memory 250, and interface 240. Interface 240 connects to external communications platforms or networks, such as PBX, LEC, PSTN, cellular, or the Internet. Interface 240 also contains electronic circuitry for caller ID, ring detection, and call placement. Memory 250 is coupled to processor 230, and provides storage capacity for data structures and files such as a contacts database, audio files, user settings, applications, data files, etc.

The present invention is drawn to a system and method for generating customized ringtones based upon a previous conversation stream. The presently described embodiments of the invention may be implemented in software, hardware, or a combination of both. Furthermore, while data storage is primarily understood to be local to the terminal/handset, it is contemplated any or all of the presently described embodiments of the invention may reside on or otherwise utilize networked servers, storage and the like.

Figure 3:
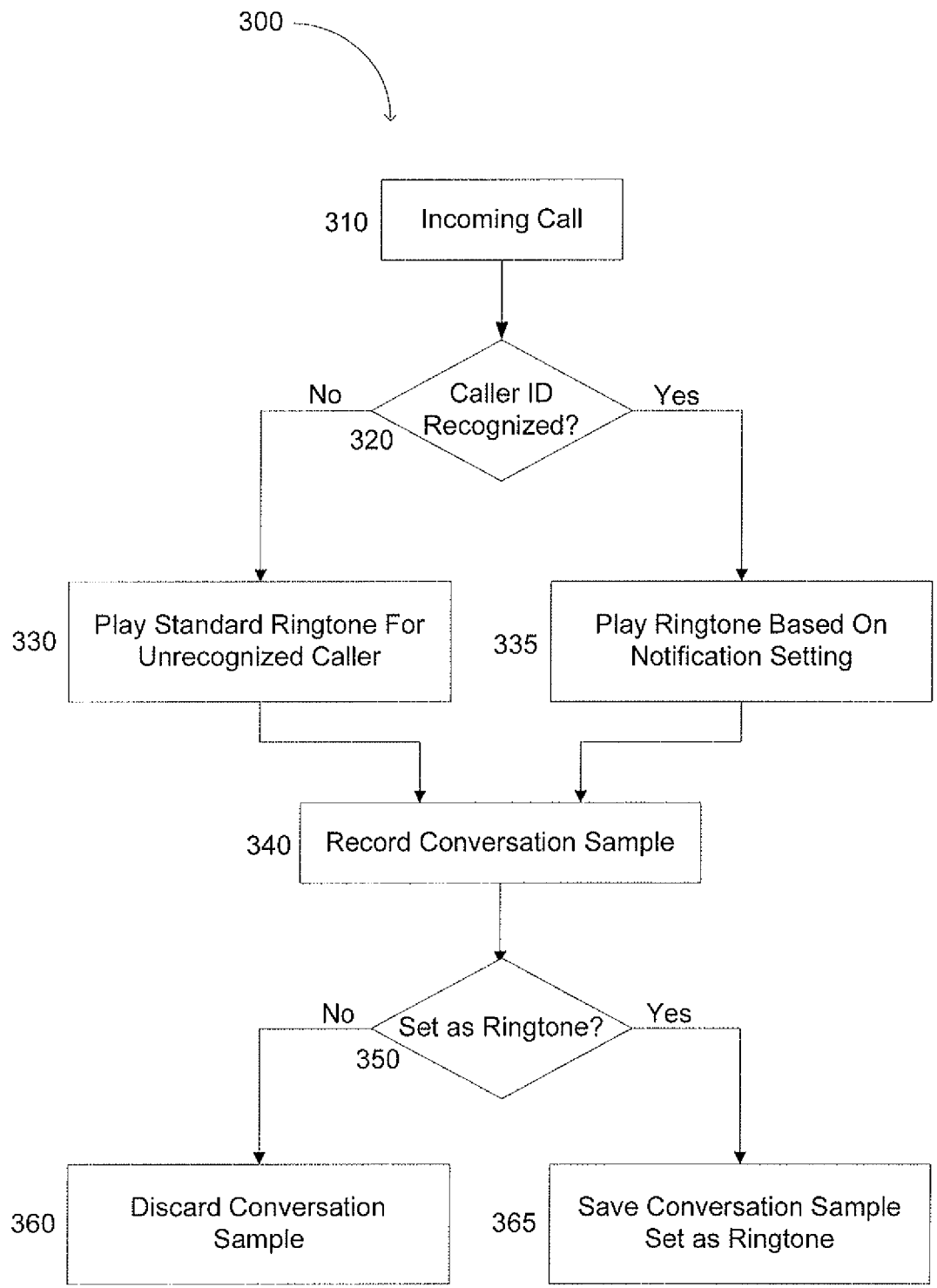
FIG. 3 is a flow diagram illustrating a method of creating and using a conversation-based ringtone.

With reference to FIG. 3, a flow diagram is shown illustrating a method 300 for creating and using a conversation-based ringtone in a terminal/handset in accordance with an embodiment of the present invention. At step 310, a user receives an incoming call from a caller, including caller ID information such as a telephone number. At step 320, it is determined whether the caller ID information of the caller is recognized or not. This is accomplished by checking against a contacts database, in which caller information such as name and phone number is stored. Associated with each contact in the contacts database is a notification setting indicating what ringtone to play when receiving a call from the contact. If the caller ID is not recognized in the contacts database, then at step 330, the standard ringtone for an unrecognized caller is played. On the other hand, if the caller ID is recognized in the contacts database, then at step 335, a ringtone is played based upon the ringtone setting associated with the contact. This may be a standard ringtone or some form of customized ringtone, such as a conversation-based ringtone, as is herein described. Assuming that the user answers the call, then a conversation stream will ensue.

At step 340, a sample from this conversation stream is recorded. The recording of the sample may be initiated fully automatically, or automatically as determined by a user-selected setting, or triggered manually in response to a user command. The particular sample recorded may vary in scope and duration, in accordance with various embodiments of the present invention. By way of example, various options for the recorded sample might include the following the first or last moments of the conversation, a randomly selected portion of the conversation, a concatenated and/or merged stream consisting of portions of the conversation recorded from one or more of the parties at different times during the conversation (e.g. 5 seconds of the conversation every 30 seconds), a portion of the conversation that varies depending upon the time of day, or a portion determined to be the most relevant portion by other analysis. The conversation sample is preferably recorded in a digital audio format, such as MP3, WMA, or AAC, and stored as a file and/or in a call conversation database.

At step 350, after the conclusion of the conversation, the user has the option to save and/or set the recorded conversation sample as the ringtone for that caller. If the user decides not to save the recorded sample, then at step 360, the sample is discarded. Whereas, if the user decides to set it as the ringtone, then at step 365, the notification option of the caller is set to play the recorded sample as a ringtone when a subsequent call is received from the same caller ID. In additional embodiments of the present invention, the recorded sample may be further processed—such as by applying sound effects, or by combining it with other sounds or music—either before or concurrently as it is used as a ringtone.

Figure 4:
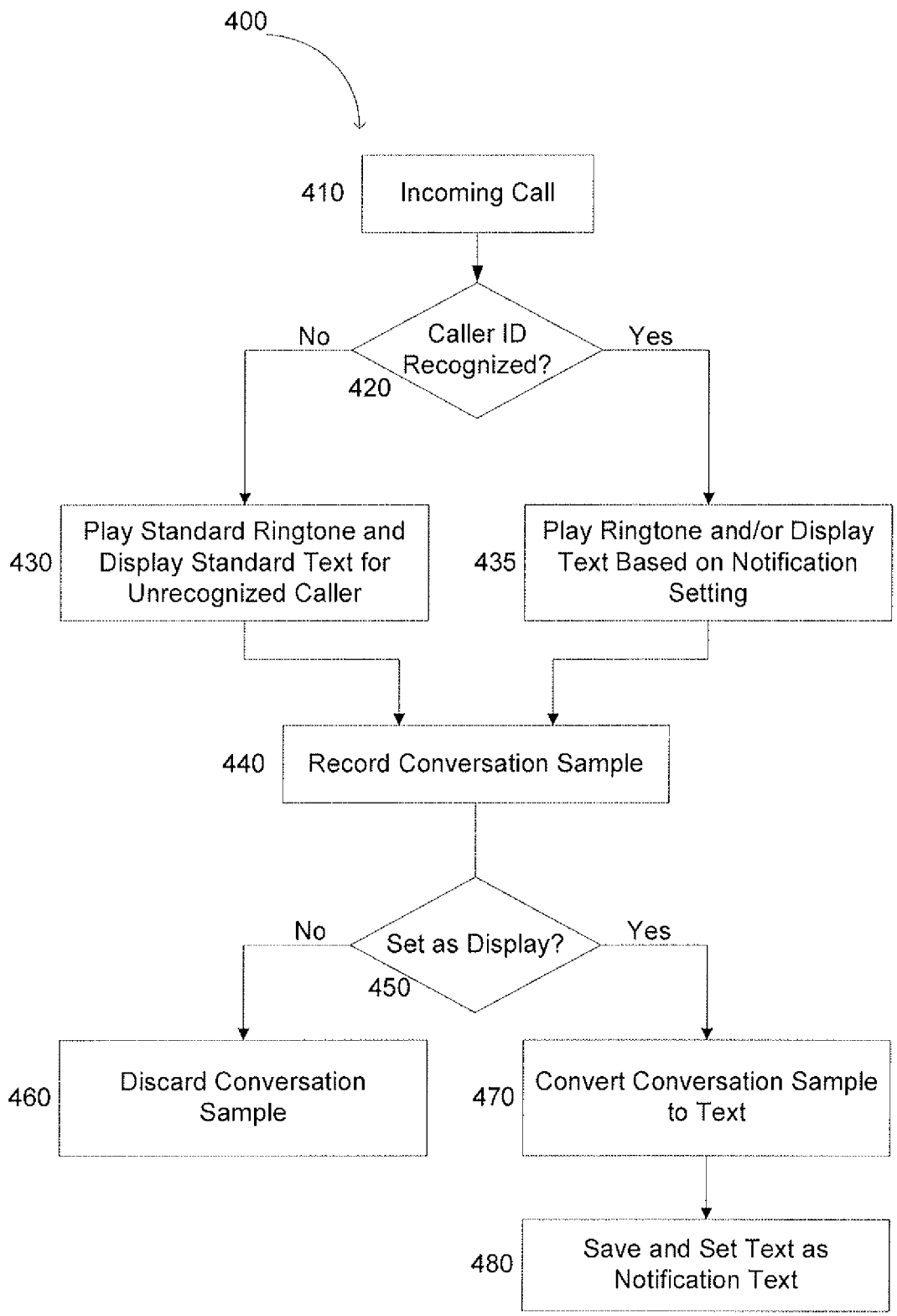
FIG. 4 is a flow diagram illustrating a method of creating and using a conversation-based textual display notification.

With reference to FIG. 4, a flow diagram is shown illustrating a method 400 of creating and using a conversation-based textual display notification, in accordance with an alternative embodiment of the present invention. At step 410, the user receives an incoming call from a caller, including caller ID information. At step 420, it is determined whether the caller ID information is recognized, by reference to a contacts database. If the caller ID is not recognized, then at step 430, a standard ringtone and standard text is displayed for the unrecognized caller. If the caller ID is recognized, then at step 435, a ringtone is played and text is displayed based upon the notification setting associated with the contact. At step 440, a sample of the conversation stream is recorded. At step 450, the user has the option to set the recorded conversation sample as text to be displayed when a subsequent call from the same caller is received. If the user decides not to do so, then at step 460, the conversation sample is discarded. If the user decides yes, then at step 470, the conversation sample is converted to text by a speech-to-text method as is known in the art. At step 480, this text is saved as a file or in a database, and the notification setting for the contact is set so that the text will be displayed when a subsequent call is received from the caller.

Figure 5:
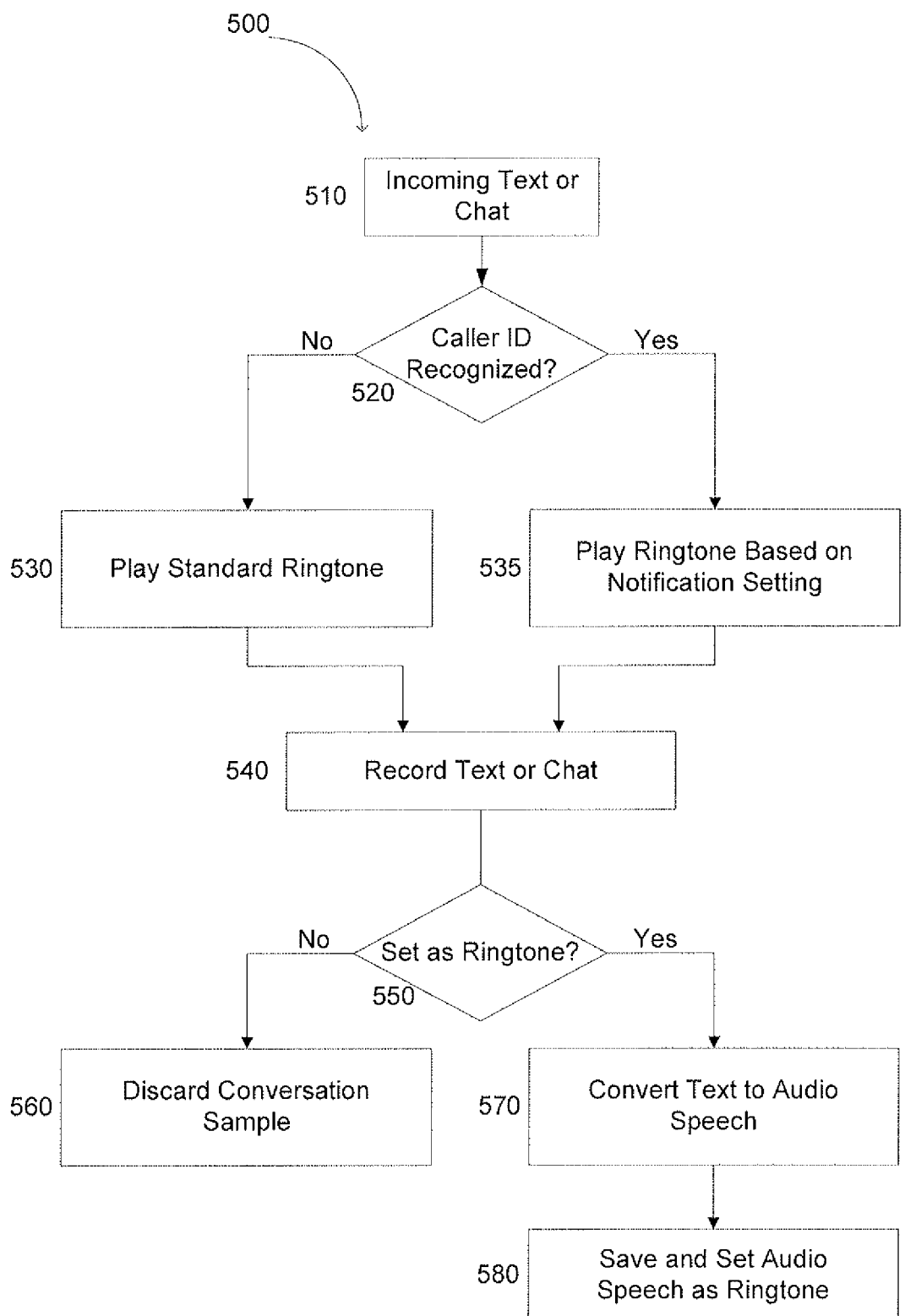
FIG. 5 is a flow diagram illustrating a method of creating and using a text-based ringtone.

With reference to FIG. 5, a flow diagram is shown illustrating a method 500 of creating and using a text-based ringtone, in accordance with an alternative embodiment of the present invention. At step 510, the user receives an incoming text message or text chat request from a caller, including caller ID information. At step 520, it is determined whether the caller ID information is recognized, by reference to a contacts database. If the caller ID is not recognized, then at step 530, a standard ringtone is played for the unrecognized caller. If the caller ID is recognized, then at step 535, a ringtone is played based upon the notification setting associated with the contact. At step 540, the text is recorded. In the case of a text message, the text will already be saved so it is likely that no additional recording is required. However, in the case of a chat, then the text will be captured as a chat log. Furthermore, it may be desirable to select a sample from the captured text. At step 550, the user has the option to set the recorded text as a ringtone to be played when a subsequent call from the same caller is received. If the user decides not to do so, then at step 560, the user has the option to discard the recorded text. If the user decides yes, then at step 570, the conversation sample is converted to audio speech by a text-to-speech method as is known in the art. At step 580, this audio speech is saved as an audio file or in a database, and the notification setting for the contact is set so that the speech will be played when a subsequent call is received from the caller.

Figure 6:
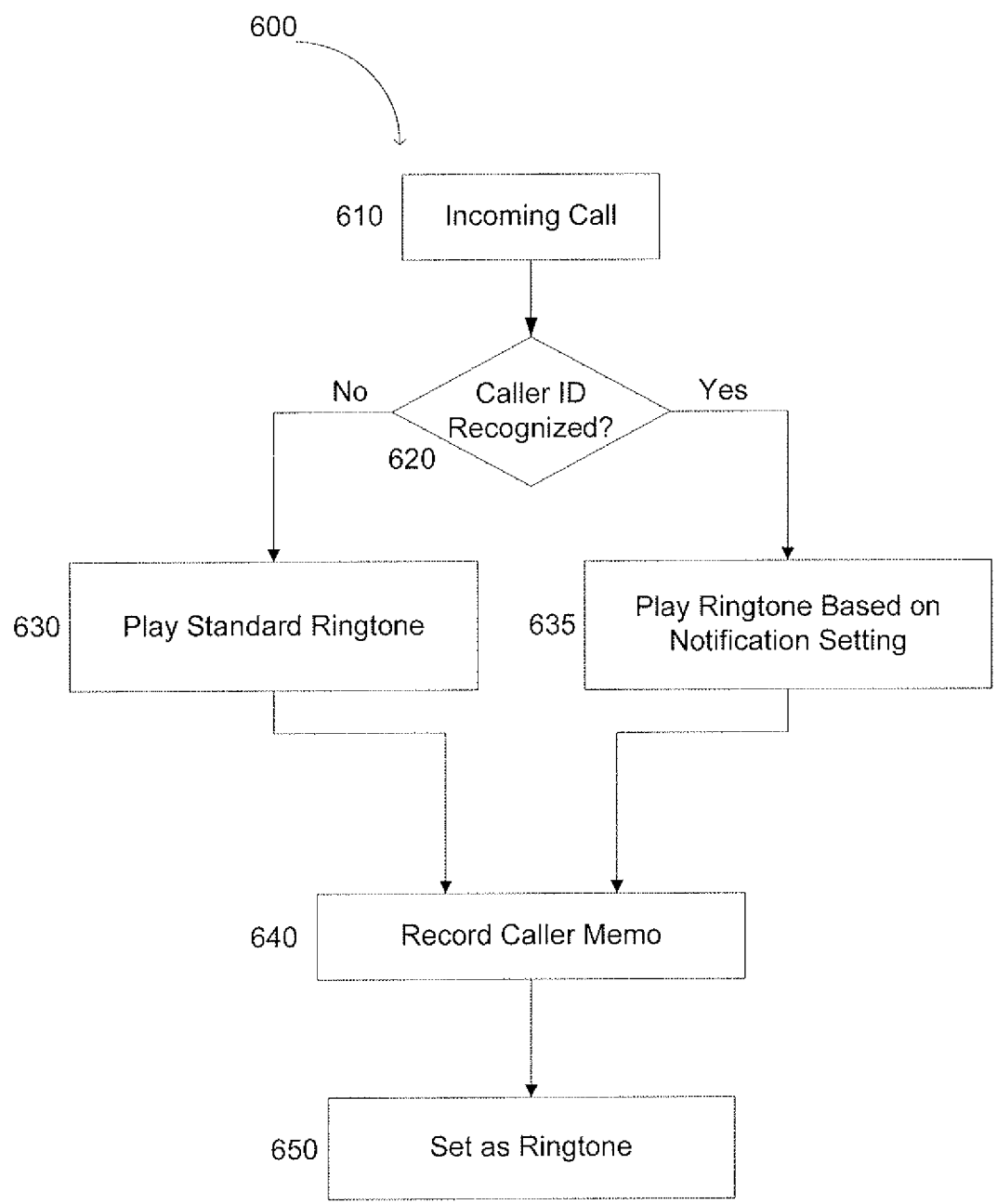
FIG. 6 is a flow diagram illustrating a method of creating and using a caller memo-based ringtone.

With reference to FIG. 6, a flow diagram is shown illustrating a method 600 of creating and using a caller memo-based ringtone, in accordance with an alternative embodiment of the present invention. At step 610, the user receives an incoming call from a caller, including caller ID information. At step 620, it is determined whether the caller ID information is recognized, by reference to a contacts database. If the caller ID is not recognized, then at step 630, a standard ringtone is played for the unrecognized caller. If the caller ID is recognized, then at step 635, a ringtone is played based upon the notification setting associated with the contact. Assuming that the caller is unavailable or otherwise does not take the call, then at step 640, the caller records a memo to be used as a ringtone. At step 650, the recorded memo is saved as an audio file or in a database, and set as a ringtone to be played when a subsequent call from the same caller is received.

Prior art mechanisms exist for establishing voice communications between two computers over the internet. An example of a system that can provide such an ability in a personal computer using standard communication mechanisms is disclosed in the book *Programming Flash Communication Server*, written by Brian Lesser, Giacomo Guilizzoni, Robert Reinhardt, Joey Lott, and Justin Watkins (O'Reilly Media, Inc. 2005; ISBN: 0596005040), incorporated herein by reference. This book, and many systems built using its basic methodology, such as the Ribbit platform, use the Flash standard for conducting the audio stream to computer speakers, in particular by means of the Flash NetConnection and Netstream objects which invoke Adobe Flash proprietary facilities running under a browser such as the open source Firefox. Other books that have covered this topic in detail include Macromedia® Flash™ MX 2004 for *Rich Internet Applications*, by Phillip Kerman, (New Riders 2003, Print ISBN-10: 0-7357-1366-9) incorporated herein by reference, in which it is noted that two NetStream instances are necessary for simultaneous transmission and receipt of audio or video, as in a telephone. Another book, *Flash 8: Projects for Learning Animation and Interactivity*, by Rich Shupe; Robert Hoekman, Jr., (O'Reilly 2006, Print ISBN-10: 0-596-10223-2, Print ISBN-13: 978-0-59-610223-4), incorporated herein by reference, analogizes the NetConnection as the phone call made to a company switchboard, and the NetStream as the conversation. These and many other examples incorporate code that implements dual Netstream instances, each providing the sound (and optionally video) architecture, to provide for varying degrees of convenience in telephonic communication. Platforms such as Ribbit instantiate such methods with industrial scaling, dialing code conveniences and bridges to the general phone networks to provide VOIP connectivity to traditional handsets. Migration routes such as Maemo and WinMo have brought the applications and interfaces into small handsets. Many of these platforms further are open to allow developers to address them by creating applications using the existing phone communications mechanism.

To provide for simultaneous Recording capability on top of telecommunications within, an "Open Source" (Linux-based) project which addresses the same NetStream and NetConnection standards can be used on the client side. Furthermore, by operating under Linux, the entire client-side set up is rendered in Open Source and can be modified at will by any programmer, using the project documentations which are publicly available and known to those in the art. Methods for saving files, processing and working with sounds are quotidian within such an enabled context. In particular, an Open Source project which addresses the same NetStream and NetConnection standards that can be used conveniently on the client side, particularly under Linux, is Gnash.

With a commercial phone platform such as Ribbit or equivalent commercial or constructed, the Gnash "open source" Gnu Public License project provides a full source code library that replaces the Adobe Flash audio handling implementation in a FireFox plug-in. Thus, the code may be modified to retain in memory a copy of each sound as it is played, along with processing it as desired. Gnash and its source code are incorporated herein by reference, a listing of which is provided in the gnash.txt file included in the computer listing appendix described above.

Figure 7:
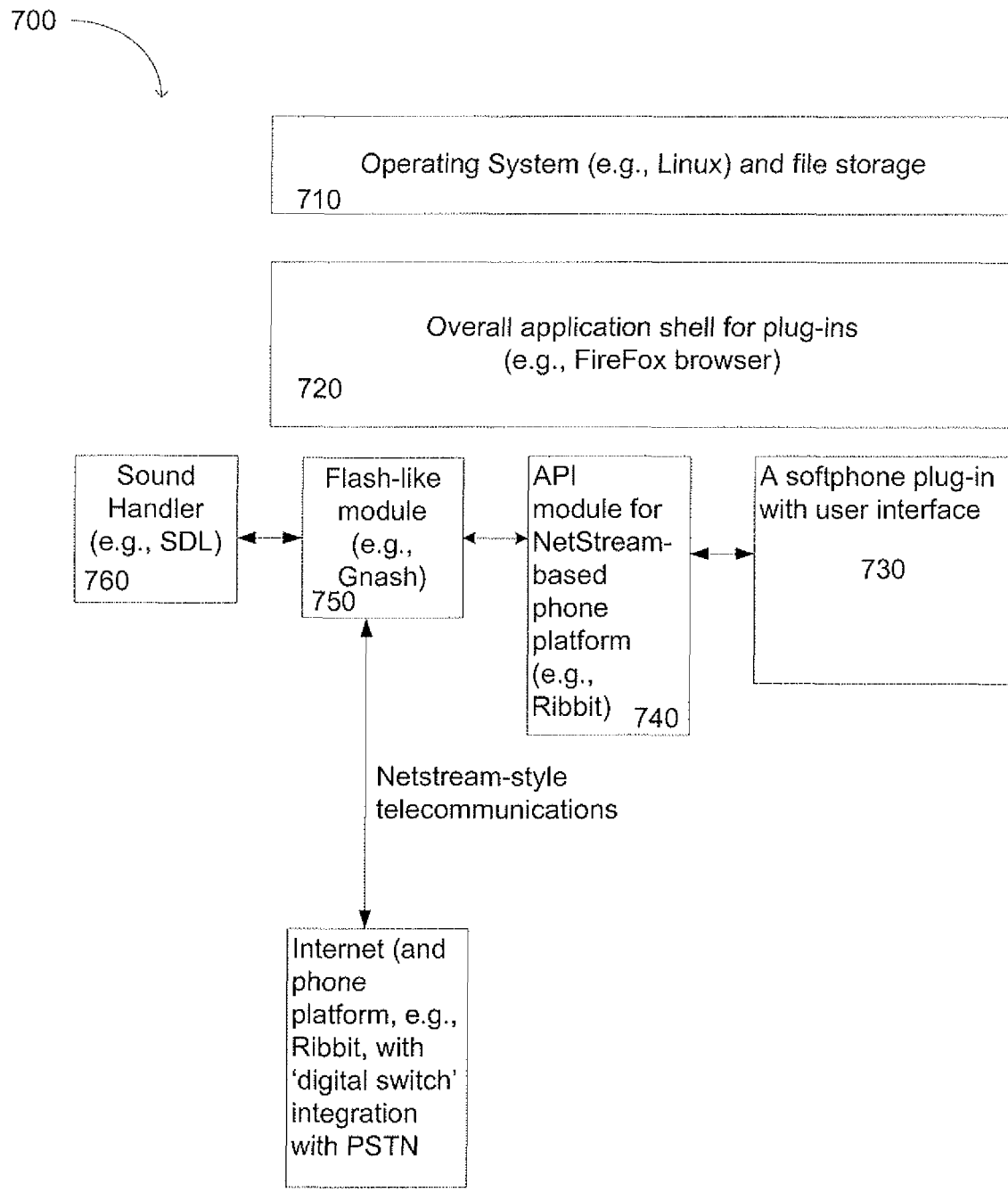
FIG. 7 is a diagram of a Netstream-type communications system, in which the present invention may be implemented.

With reference to FIG. 7, a Netstream-type communications system as presently described is shown, in which the present invention may be implemented. Operating system 710 (e.g. Linux) provides a platform and access to file storage.

Application shell 720, such as a browser (e.g. the open source standard Firefox), provides a shell for plug-ins. Softphone plug-in 730 provides a user interface for a software telephone. API module 740 (for a Netstream-based phone platform such as Ribbit) facilitates interaction with Flash-like module 750 (e.g. Gnash), which handles Netstream-type telecommunications streams communicated over the internet. Sound handler 760 (e.g. SDL) facilitates production of sound.

In accordance with an embodiment of the present invention, we presently disclose a set of modifications to Gnash to provide for conversation-based ringtone functionality. The Gnash code's implementation of the NetConnection and NetStream class relies on a pair of "sound_handlers." One sound_handler is designated GST (GStreamer); the other Sound handler of Gnash is designated by SDL, Simple Directmedia Layer.

Either or both sound_handler platforms are modifiable to afford Gnash a recording capability, depending on the additional capabilities desired in a customized ringtone instance. GStreamer is suited for more elaborate sound processing, and required for video; thus, modification of the simpler SDL version suffices for a straightforward telephonic embodiment of the present invention, which clearly can be extended to the video sound handler, too. Four Public Member Functions lie at the crux of the SDL-based Gnash implementation:

1) virtual int create_sound (void*data, int data_bytes, int sample_count, format_type format, int sample_rate, bool stereo) Called to create a sound.
2) virtual long fill_stream_data (void*data, int data_bytes, int sample_count, int handle_id) Called when a stream gets more data.
3) virtual void play_sound (int sound_handle, int loop_count, int offset, long start_position, std::vector<sound_envelope>*envelopes) Play the indexed sample.
4) virtual void delete_sound (int sound_handle) Called when it is done with a sample.

These functions are implemented, for the SDL case, in the source code, (reproduced in the SDL_source.doc file for convenience, and incorporated by reference as listed above).

The SDL library called by these Gnash facilities performs the actual invocation of the OS and/or hardware sound production audio driver type code to make sound from the speakers. The SDL audio runs independently in a separate thread, filled via a callback mechanism to Gnash. Further detail is publicly available from a variety of sources, known to those in the art, such as the book *Linux Multimedia Hacks* by Kyle Rankin, (O'ReillyPub 2005, Print ISBN-10: 0-596-10076-0, Print ISBN-13: 978-0-59-610076-6), which will be helpful in tuning the instantiation to a particular specification, and make it clear how to work with sound at this level. Given those teachings, the Gnash sound_play code (a subset of the SDL source code, extracted for convenience in the sound_play.doc file, incorporated by reference as listed above) can be modified; the crux of that mod consists of inserting code at the end, before the close brace and just after the fragment:

```
if (soundsPlaying == 1) {
        SDL_PauseAudio(0);
}
``` which will thus be invoked as each sound fragment, which has come from the NetStream Flash-like call to GNASH, is passed to the SDL to be played. (Note that the SDL_PauseAudio(0); calling line actually starts the sound fragment playing.) This sound fragment can then be output to longer term memory storage by means readily known in the art, assembling the fragments or further processing them in turn to produce a saved copy of some or all of the input sound stream which will serve as the source for the customized ringtone. Alternately, the SDL library itself can be modified to save such a file from the stream of sound sent to it.

Having those conversation sound files saved by means such as that disclosed above, or other means already known in the art, they may further be associated with keys designating the caller, stored and retrieved from a database on that basis by means well known in the art to enable the production of customized ringtones as described.

Figure 8:
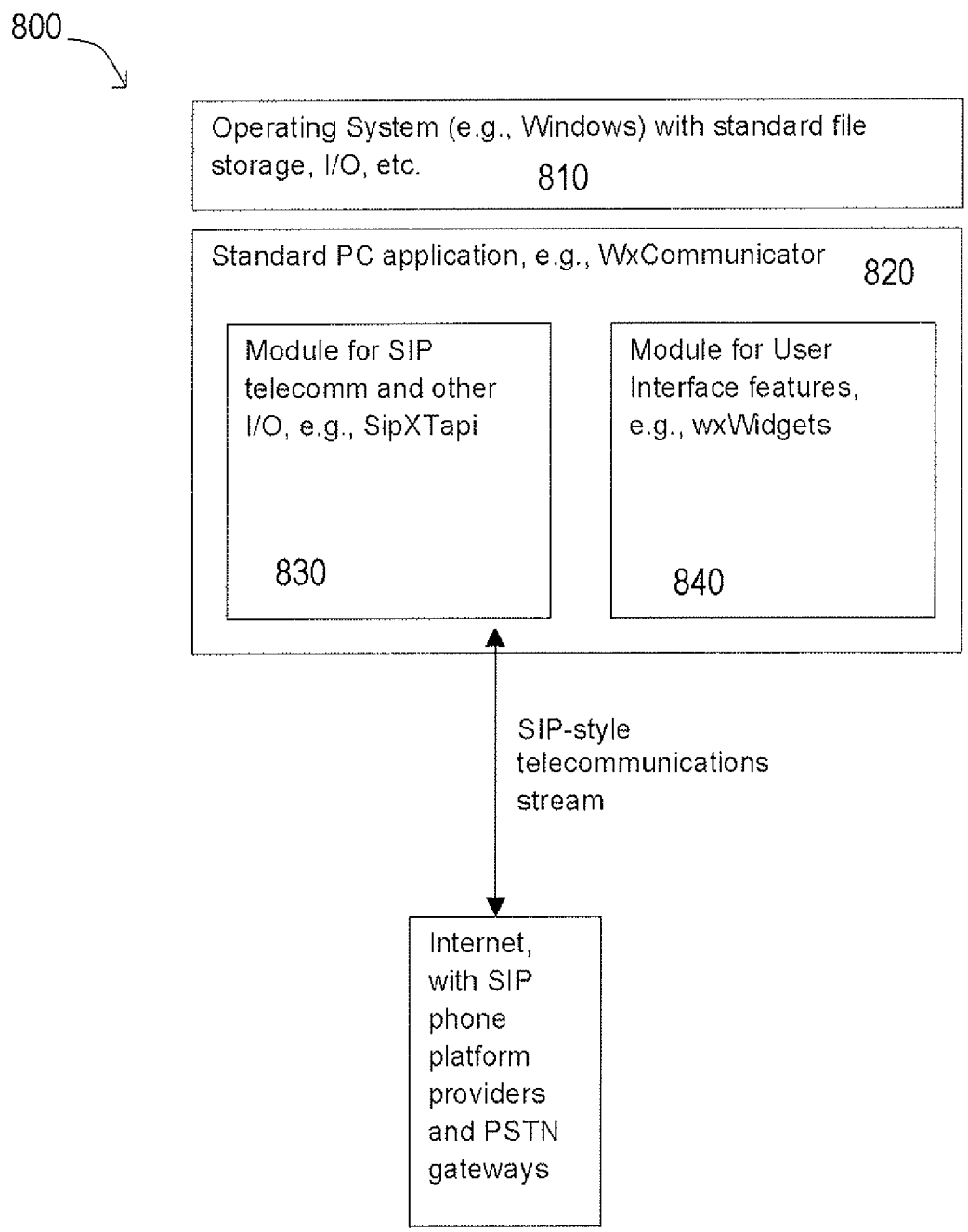
FIG. 8 is a diagram of a SIP-type communications system in which the present invention may be implemented.

Alternatively, any of a number of SIP-type softphones could be modified to provide a basis for practicing the present invention. With reference to FIG. 8, a SIP-type communications system 800 is shown, in which the present invention may be implemented. Operating system 810 (e.g. Windows) provides a platform and access to file storage, I/O, etc. Application 820, such as wxCommunicator, includes module 830 for handling SIP (Session Initiation Protocol) telecommunications and other I/O, and module 840 for user interface features. Application 820 supports a SIP-type telecommunications stream that runs over the internet.

For purposes of implementing the principles of the present invention, wxCommunicator provides an open source project with full source code and documentation that is publicly available and known to those in the art. As it already contains user accessible call record and ringtone functions, one call implement the present invention within its context. In order to facilitate the functions as disclosed herein in accordance with the present invention, wxCommunicator's ringtone function can be modified to retrieve a file selected programmatically instead of by the user, and its recording function changed to record in accordance with an aspect of the invention instead of via a manual start command from the user.

Figure 9:
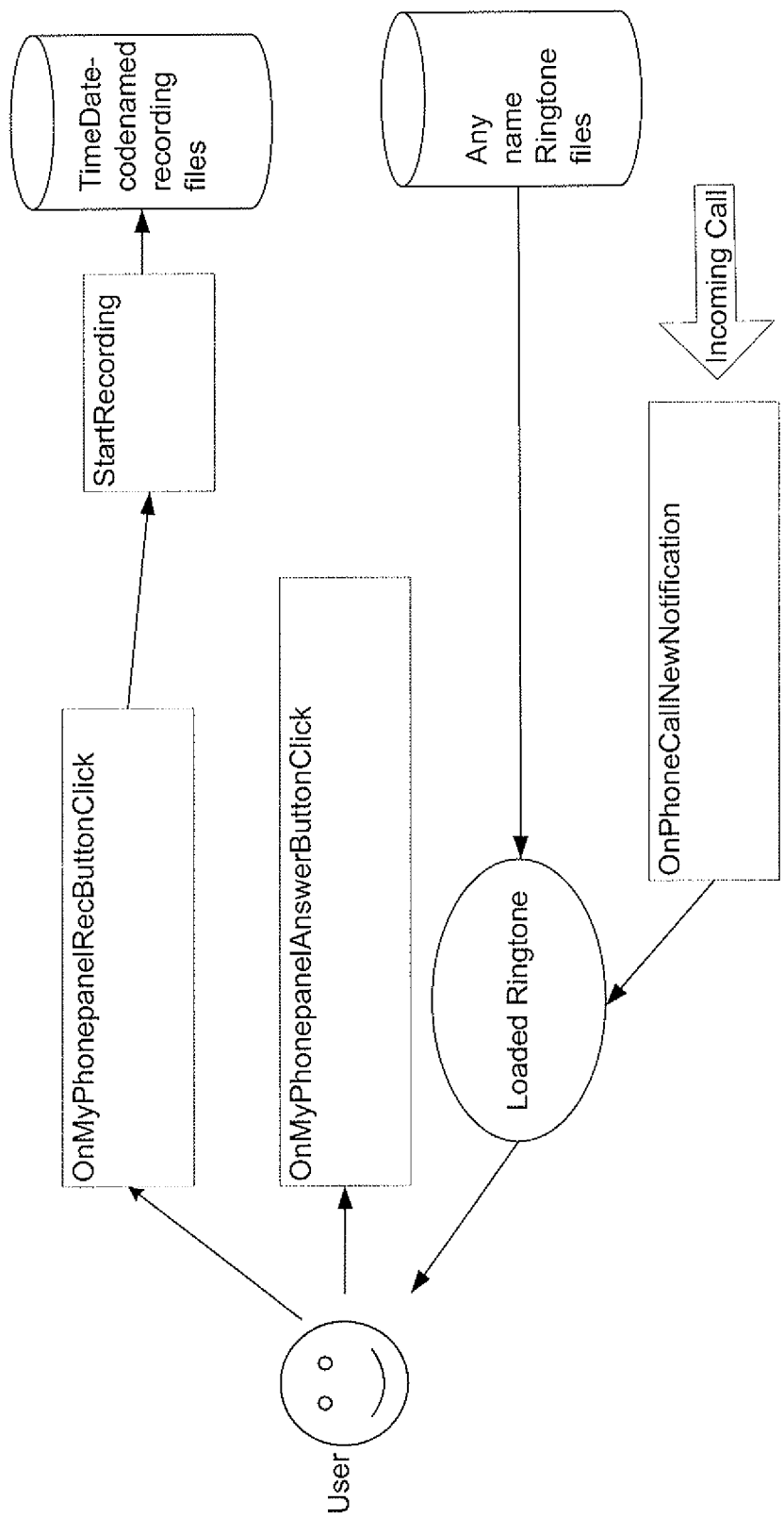
FIG. 9 is a block diagram showing the basic unmodified architecture of wxCommunicator.

Therefore, in accordance with an embodiment of the present invention, we presently disclose a set of modifications to wxCommunicator that implement the conversation-based ringtone mechanism. These modifications are applied to the standard version of wxCommunicator, (herein incorporated by reference, a listing of which is supplied in the file wxCommunicator.txt in the computer listing appendix, as indicated above), which compiles with Visual Studio 2005 and runs on Windows XP. FIG. 9 illustrates in a block diagram the basic unmodified architecture of wxCommunicator (not all connections shown).

To begin with, it is noted that the line of code in sipxtapiproxy.cpp, in StartRecording:
wxString path=wxString::Format(wxT("%s\\recordinigs"), wxGetApp( ).m_Configurator.GetDataPath( ));
in the unmodified wxCommunicator source code release specifies the name of the folder in which call recordings are saved as "recordings." This is changed to save in the same folder, "sounds," as the ringtones:
wxString path=wxString::Format(wxT("%s\\sounds"), wxGetApp( ).m_Configurator.GetDataPath( ));
This creates a version of wxCommunicator in which a portion of a phone conversation can be recorded, saved, and manually selected to be subsequently used as a ringtone.

Next, to add functionality the first part of StartRecording's code is changed, so it reads as shown below:

```
/****************************************************************
*/
/*    start call recording // mod for reminder-ring              */
/****************************************************************
*/
bool SipXTapiProxy::StartRecording(PhoneCall *pPhoneCall, wxString call_username)
const
{
  if (m_SipXInstance && !m_bSipXCallInProgress)
  {
    if (pPhoneCall)
    {
      // mods for simple starter version of reminder ring:
      // first: replace 'recordings' directory name with the ringtones directory name,
'sounds'
      // previously, the next line was:
      // wxString path = wxString::Format(wxT("%s\\recordings"),
wxGetApp( ).m_Configurator.GetDataPath( ));
      // now changed to:
      wxString path = wxString::Format(wxT("%s\\sounds"),
wxGetApp( ).m_Configurator.GetDataPath( ));
      // previous code, to do user-selected ring; probably want to bring back later for
offering alternative
      // wxDateTime timeNow = wxDateTime::Now( );
      // wxString filename = wxString::Format(wxT("%s\\%s.wav"), path,
timeNow.Format(wxT("%Y-%m-%d %H-%M-%S")));
      /* Next, just create based file name with reminder ring file name */
      // for this prototype, first just map special chars to produce a unique but
acceptable file name for Windows
      // embodied with a simple fix for now just for the two special chars " and,
      // that show up in SIP bridge caller ids but can't be in file name.
      // more elaborate version later can offer user choice of rr or standard rings, map
all special chars algorithmically
      wxString temp_string = call_username;
      temp_string.Replace(wxT("\""), wxT("-quote-"));
      temp_string.Replace(wxT("\""), wxT("-quote-"));
      temp_string.Replace(wxT(","), wxT("-comma-"), 1);
      call_username = temp_string;
      wxString mapped_call_username = call_username;
      wxString filename = wxString::Format(wxT("%s\\%s.wav"), path, call_username);
```

```
    SIPX_RESULT sipxResult;
    sipxResult = sipxCallAudioRecordFileStart(pPhoneCall->m_hCall,
filename.mb_str(wxConvUTF8));
    if (sipxResult != SIPX_RESULT_SUCCESS)
    {
      LOGBASIC(LOG_ERROR, _("sipxCallAudioRecordFileStart failed, error code
%i"), sipxResult);
      return false;
    }
    else
    {
      LOGBASIC(LOG_VERBOSE, _("sipxCallAudioRecordFileStart call
successful"));
      pPhoneCall->m_bIsSoundBeingRecorded = true;
      pPhoneCall->OnChanged( ); // notify observers, maybe they are displaying this
info somewhere
      return true;
    }
  }
  else
  {
    LOGBASIC(LOG_ERROR, _("Wrong parameters in StartRecording"));
    return false;
  }
 }
 else
 {
   LOGBASIC(LOG_ERROR, _("Aborting call, another async sipxtapi call is in
progress, or sipxtapi is not initialized."));
 }
 return false;
}
```

Thus, the file name under which a recording is saved is unique to the "caller ID" (often called user name in SIP; the terms are applied interchangeably for purposes of the present disclosure). (It is noted that if a 'bridge' or 'gateway' from PSTN to SIP is used by the caller, instead of a sister SIP phone, the origin PSTN caller-id code may not be available, or, for instance, will be replaced with a designation of the caller's geographic location such as their city, and thus all calls from that gateway, or through that gateway from a particular city, respectively, may ring the same ringtone; but this example suffices to illustrate the technique that can be applied in other contexts as are described elsewhere in this disclosure.)

Then at the end of phonepanel.h, a declaration is added for rr_username to hold the callerID, making the end of the file read:

```
wxBitmapButton* m_BlindTransferButton;
// mod for reminder-ring
wxString rr_username;
 /// Control identifiers
 enum {
   MYFRAME_PHONEPANEL = 10008
 };
////@end MyPhonePanel member variables
 MyBitmapToggleButton* m_CurActiveLineBtn; ///< pointer to active
line button
 MyLineButtonArray m_LineButtonArray;   ///< array of line buttons
};
#endif
 // _PHONEPANEL_H_
And in SipXTApiProxy.h, in order to pass in the caller id needed to
generate a unique reminder ring file name for each 'caller id' (usually
related to username in this SIP-related codebase), a parameter is added to
the calling sequence of
bool StartRecording(PhoneCall *pPhoneCall) const;
in its declaration, making it:
bool StartRecording(PhoneCall *pPhoneCall, wxString
username_parameter_for_rr) const;
```

In phonepanel.cpp, OnMyphonepanelRecbuttonClicked call is changed to startRecording to pass in the caller id (i.e., user name), as follows:

```
void MyPhonePanel::OnMyphonepanelRecbuttonClicked(
wxCommandEvent& event )
{
 // set rec button to previous state, as it will be updated to correct state by
 event
 m_RecButton->SetValue(!m_RecButton->GetValue( ));
 PhoneCall* pCall = GetSelectedPhoneCall( );
 if (pCall)
 {
  if(!pCall->m_bIsSoundBeingRecorded)
  {
  // mod for reminder-ring
  // SipXTapiProxy::getInstance( )->StartRecording(pCall);
    SipXTapiProxy::getInstance( )->StartRecording(pCall, rr_username);
  }
  else
  {
   SipXTapiProxy::getInstance( )->StopRecording(pCall);
  }
 }
}
```

Also in that file, OnPhoneCallNewNotification is modified so it saves the caller id of an incoming call:

```
void MyPhonePanel::OnPhoneCallNewNotification(wxCommandEvent
&event)
{
 PhoneCall *pCall = wxDynamicCast(event.GetEventObject( ),
 PhoneCall);
 if (pCall)
 {
  int pos;
  wxListItem listItem;
  int lineIndex =
```

-continued

```
DataModel::getInstance( )->FindLineIndexByHandle(pCall->m__hLine);
   wxString statestr =
   SipXTapiProxy::getInstance( )->GetCallStateString(pCall);
   listItem.SetText(wxString::Format(wxT("%i"), lineIndex + 1));
   listItem.SetColumn(0);
   listItem.SetData(pCall->m__hCall);
   pos = m__MainCallList->InsertItem(listItem);
   m__MainCallList->SetItem(pos, 1, statestr);
   wxString username = SipXTapiProxy::getInstance( )-
>GetUsernameFromSipUri(pCall->m__sRemoteParty);
   m__MainCallList->SetItem(pos, 2, username);
   // mod for reminder-ring: pass the username on to id the recorded call
fragment
   rr__username = username;
   long selectedItemId = GetSelectedCallItemId( );
   m__MainCallList->SetItemState(selectedItemId, 0,
wxLIST__STATE__FOCUSED|wxLIST__STATE__SELECTED);
   m__MainCallList->SetItemState(pos, 6,
wxLIST__STATE__FOCUSED|wxLIST__STATE__SELECTED);
  }
}
```

The result is then a version of the wxCommunicator softphone that will allow the user to record conversation and have it automatically saved under a unique identifier as a ringtone, which can be manually chosen from the wxCommunicator ringtone menu. To complete the basic implementation of a conversation-based ringtone one can make the manual choice automatic. A line is added to the end of OnPhoneCallNewNotification, so it is as follows:

```
void MyPhonePanel::OnPhoneCallNewNotification(wxCommandEvent
&event)
{
  PhoneCall *pCall = wxDynamicCast(event.GetEventObject( ),
  PhoneCall);
  if (pCall)
  {
   int pos;
   wxListItem listItem;
   int lineIndex =
   DataModel::getInstance( )->FindLineIndexByHandle(pCall-
>m__hLine);
   wxString statestr =
   SipXTapiProxy::getInstance( )->GetCallStateString(pCall);
   listItem.SetText(wxString::Format(wxT("%i"), lineIndex + 1));
   listItem.SetColumn(0);
   listItem.SetData(pCall->m__hCall);
   pos = m__MainCallList->InsertItem(listItem);
   m__MainCallList->SetItem(pos, 1, statestr);
   wxString username = SipXTapiProxy::getInstance( )-
>GetUsernameFromSipUri(pCall->m__sRemoteParty);
   m__MainCallList->SetItem(pos, 2, username);
   // mod for reminder-ring: pass the username on to id the recorded call
fragment
   rr__username = username;
   long selectedItemId = GetSelectedCallItemId( );
   m__MainCallList->SetItemState(selectedItemId, 0,
wxLIST__STATE__FOCUSED|wxLIST__STATE__SELECTED);
   m__MainCallList->SetItemState(pos, 6,
wxLIST__STATE__FOCUSED|wxLIST__STATE__SELECTED);
   // mod for reminder-ring: grab the sound for this caller
   SipXTapiProxy::getInstance( )->ReloadRingtone(username);
  }
}
```

And additional code to perform the 'ReloadRingtone' function is inserted into SipXTapiProxy.h:

```
bool    ReloadRingtone(wxString    username_parameter__
    for__rr);
``` and to SipXTapiProxy.cpp, where the temp string encoding used previously is repeated:

```
/*******************************************************
*/
/*    reload ringtone    // mod for reminder-ring            */
/*******************************************************
*/
bool SipXTapiProxy::ReloadRingtone(wxString call__username)
{
        // mods for simple starter version of reminder ring:
            wxString path = wxString::Format(wxT("%s\\sounds"),
   wxGetApp( ).m__Configurator.GetDataPath( ));
            wxString temp__string = call__username;
            temp__string.Replace(wxT("\""), wxT("-quote-"));
            temp__string.Replace(wxT("\'"), wxT("-quote-"));
            temp__string.Replace(wxT(","), wxT("-comma-"), 1);
            call__username = temp__string;
     wxString changeto__filename =
wxString::Format(wxT("%s\\%s.wav"), path, call__username);
            wxString current__filename =
::wxGetApp( ).m__Configurator.GetCurrentRingtonePath( );
            wxString filename = changeto__filename;
        //wxString sRingtone = DataModel::getInstance( )-
>m__AudioSettings.getRingtone( );
            //wxString sRingtonePath =
::wxGetApp( ).m__Configurator.GetCurrentRingtonePath( );
            // mod for reminder-ring prototype
            //m__RingtonePlayer.LoadFile(sRingtonePath);
            m__RingtonePlayer.LoadFile(filename);
            return true;
}
```

The result is the further functionality of playing as a ringtone the last sound recorded by the user of an incoming call from that caller id. (It is recognized that further refinement of the presently disclosed system may entail addressing the following: various file sizings, error diagnosing, perfect initializations, proper handling of outgoing calls, multiple lines, merging voice streams, conference calls, etc.) To facilitate automatic recording of the line a further modification to phonepanel.cpp is performed:

```
void MyPhonePanel::OnMyphonepanelAnswerbuttonClick(
wxCommandEvent& event)
   {
   PhoneCall* pSelectedCall = GetSelectedPhoneCall( );
   // we pick up if call is in ALERTING state, or dial if not
   SipXTapiProxy::getInstance( )->OnAnswerbuttonClick(pSelectedCall);
   // mod for reminder-ring prototype: start recording every call answered
   if (pSelectedCall)
   {
         wxCommandEvent dummy__event;
            OnMyphonepanelRecbuttonClicked(dummy__event);
/* just pretend the user clicked Record */
   }
}
```

Figure 10:
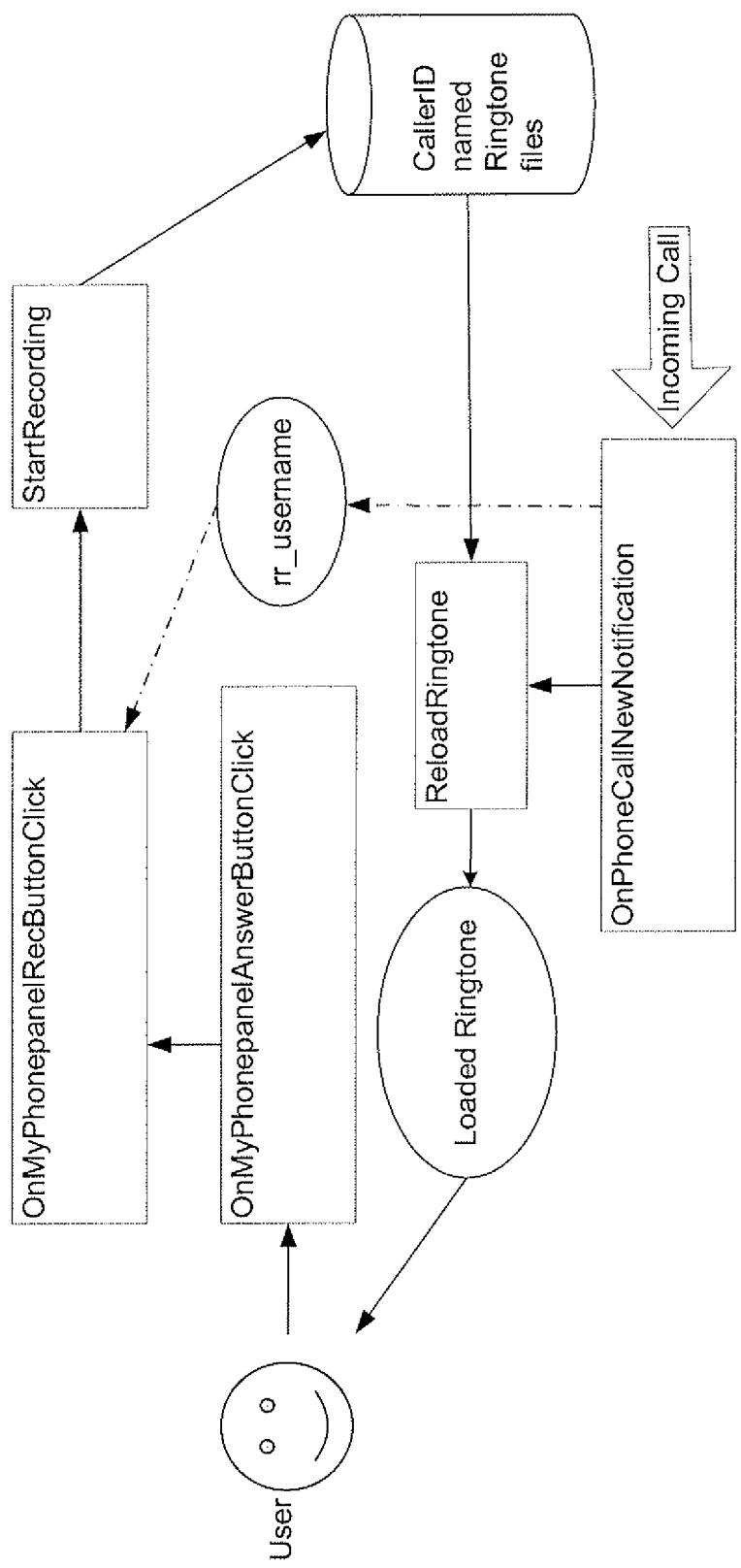
FIG. 10 is a block diagram showing the modified architecture of wxCommunicator in accordance with an embodiment of the present invention.

In sum, the open source wxCommunicator SIP softphone is modified by making changes to the code for StartRecording, OnMyphonepanelAnswerbuttonClick, OnMyphonepanelRecbuttonClicked, OnPhoneCallNewNotification; adding a global variable rr_username shared between the latter two; and new code to make ReloadRingtone. (These are shown in final modified form in the computer listing appendix in the file modified_wxCommunicator.txt, herein incorporated by reference as described above.) The modified wxCommunicator architecture is illustrated as a block diagram in FIG. 10 (not all connections shown). The aforementioned modifications to wxCommunicator provide a basic conversation-based ringtone capability: incoming calls ring using a recording of the caller's voice from a prior conversation. Additional capability such as that described elsewhere in this disclosure can be built, by means known in the art, on this foundation or alternatives.

Information as herein shown and described in detail is fully capable of attaining the above-described object of the invention, the presently preferred embodiments of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural, electrical, and functional equivalents to the elements of the above-described preferred embodiment and additional embodiments that are known to those of ordinary skill in the art are expressly incorporated herein by reference and are intended to be encompassed by the present claims.

Moreover, it is not necessary for a device or method to address each and every problem sought to be solved by the present invention for it to be encompassed by the present claims. Furthermore, no element, component or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed:

1. A communication device comprising:
  a. A recording memory that stores a customized conversation event created from a recorded conversation sample between a user and a caller conducted on the communication device; and
  b. An incoming call ringtone notifier, coupled to the recording media that uses the customized conversation event between the user and the caller to notify the user of a subsequent incoming call from the caller.

2. The communication device of claim 1, where the caller is identified by caller-id or IP address.

3. The communication device of claim 1, where the customized conversation event includes video elements, such as a video conference.

4. The communication device of claim 1, wherein the customized conversation event comprises the first approximately 5 seconds of the conversation with the caller.

5. The communication device of claim 1, wherein the recorded conversation sample comprises the last approximately 5 seconds of the conversation with the caller.

6. The communication device of claim 1, wherein the incoming call ringtone notifier is a text message, wherein the text comprises a partial transcript of a previous conversation between the user and the caller.

7. The communication device of claim 1, wherein the customized conversation event comprises a recorded sample of text messages between the user and the caller.

8. The communication device of claim 7, wherein, the recorded sample of text messages is converted into a voice message and used as the incoming call notifier.

* * * * *